No. 827,615. PATENTED JULY 31, 1906.
W. BURTON.
NUT LOCK.
APPLICATION FILED APR. 12, 1905.

Witnesses

Inventor
William Burton.
By Victor J. Evans,
Attorney

UNITED STATES PATENT OFFICE.

WILLIAM BURTON, OF ST. JOHN, CANADA.

NUT-LOCK.

No. 827,615.   Specification of Letters Patent.   Patented July 31, 1906.

Application filed April 12, 1905. Serial No. 255,212.

*To all whom it may concern:*

Be it known that I, WILLIAM BURTON, a subject of the King of Great Britain, residing at St. John, New Brunswick, Canada, have invented new and useful Improvements in Nut-Locks, of which the following is a specification.

This invention relates to nut-locks, and has for its objects to produce a comparatively simple inexpensive device of this character in which the nut will be securely locked against movement, one in which the nut may be readily released when circumstances require, and one in which the plate carrying the locking member will be maintained properly in position upon the bolt.

To these ends the invention comprises the novel features of construction and combination of parts more fully hereinafter described.

Figure 1:
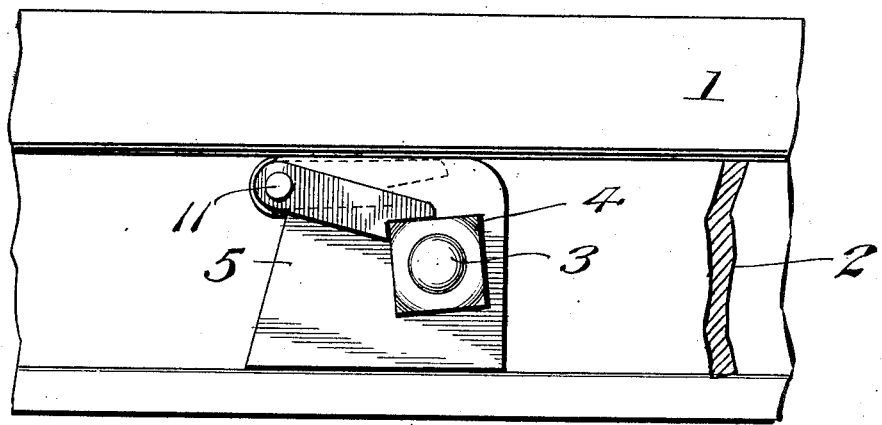
Figure 2:
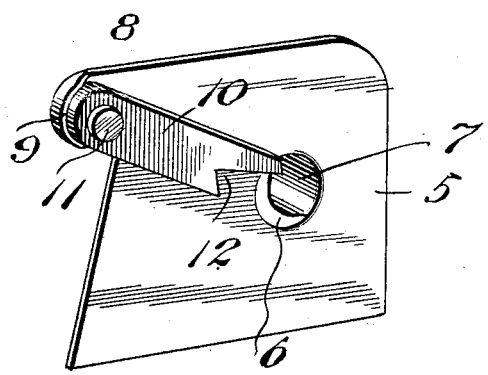
Figure 3:
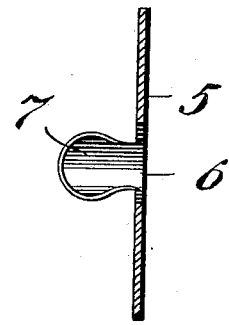

In the accompanying drawings, Figure 1 is a side elevation of a portion of a railway-rail, showing my improved nut-lock applied for use. Fig. 2 is a perspective view of the nut-lock. Fig. 3 is a transverse section through the plate.

Referring to the drawings, 1 designates a railway-rail, to the side of which is applied a fish-plate 2, the latter being secured in place by means of a transverse bolt 3, having a nut 4 tapped onto the end thereof, as usual.

Applied to the bolt 3 previous to the application of the nut 4 and lying flush upon the outer face of the plate 2 is a sheet-metal member or plate 5, in which is formed a bolt-receiving opening 6, produced by stamping or punching the metal 7, which is struck from the plate during the operation of forming the hole 6, being turned at right angles to the surface plane of the plate, thereby presenting an engaging member or tongue which in practice enters the bolt-receiving opening in the fish-plate and is curved in cross-section to conform to the curvature of the bolt 3.

Provided at the upper left-hand corner of the plate 5 is an ear or extension 8, having an outturned marginal flange 9, curved to conform to and constituting a bearing for the adjacent curved end of a locking member or finger 10, which is pivoted to the plate by means of a pintle 11, preferably in the form of a rivet, the free end of the engaging member 10 being notched or recessed, as at 12, for engagement with one corner of the nut 4. It is to be noted in this connection that the pivotal axis of the locking member is disposed in a plane above the nut, whereby the locking member will swing and be returned by gravity into engagement with the nut.

In practice after the bolt is seated in place and prior to application of the nut 4 thereto the plate 5 is applied in position, with the engaging member or tongue 7 entered into the bolt-receiving opening, as before explained. The nut 4 is next screwed into position upon the bolt, during which operation the locking member 10 occupies the position illustrated by dotted lines in Fig. 1. After the nut has been properly tightened upon the bolt the member 10 is moved to the locking position, (illustrated by full lines in Fig. 1,) with the recessed portion 12 seated over the corner of the nut, thereby serving to lock the latter securely against movement. It is to be noted in this connection that owing to the finger 7 being entered into the bolt-receiving opening the plate will be held steadily in position, and, further, that by the provision of the bearing-flange 9 strain upon the pintle 11 will be materially decreased, while by correspondingly curving the bearing-flange and the adjacent end of the locking-finger the latter may be moved freely on its pivot to engaging or non-engaging position.

From the foregoing it is apparent that I produce a simple inexpensive device which in practice will admirably perform its functions to the attainment of the ends in view, it being understood that minor changes in the details herein set forth may be resorted to without departing from the spirit of the invention.

Having thus described my invention, what I claim is—

In a device of the class described, a plate having a bolt-receiving opening, an engaging member or tongue formed upon the plate at the marginal edge of said opening, the tongue being disposed at right angles to the surface plane of the plate, a nut-engaging finger pivoted to the plate and having a curved end, and a bearing-flange formed upon the plate and curved to conform to and bear upon the curved end of the finger, the pivotal axis of the engaging finger being disposed in a plane above the nut.

In testimony whereof I affix my signature in presence of two witnesses.

WILLIAM BURTON

Witnesses:
 FRANCIS KERR,
 F. A. SECORD.